Nov. 11, 1969          F. Z. FOUSE          3,477,841
MOLD SUPPORT FOR GLASSWARE FORMING MACHINE
Filed July 19, 1966                 2 Sheets-Sheet 1

INVENTOR.
FREDERICK Z. FOUSE
BY
ATTORNEY

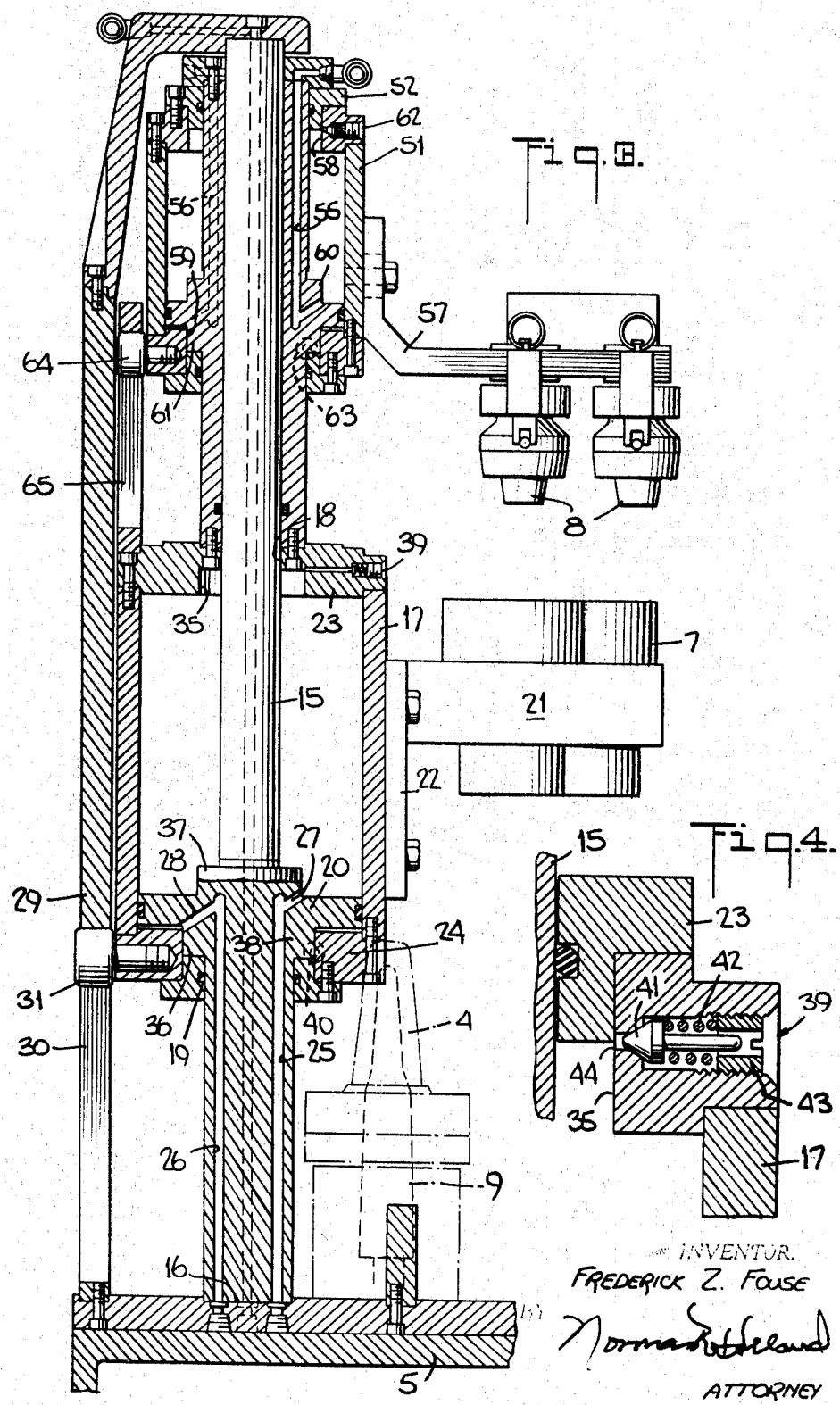

United States Patent Office  3,477,841
Patented Nov. 11, 1969

3,477,841
MOLD SUPPORT FOR GLASSWARE FORMING MACHINE
Frederick Z. Fouse, Lancaster, Ohio, assignor to Anchor Hocking Corporation, Lancaster, Ohio, a corporation of Delaware
Filed July 19, 1966, Ser. No. 566,305
Int. Cl. C03b 11/16
U.S. Cl. 65—307　　　　　　　　　　　　　　　6 Claims

ABSTRACT OF THE DISCLOSURE

A support means for moving a glass mold and cooperating mold baffle clear of a molded glass article in a glass forming machine. The mold is attached to a cylinder that is slidably moveable on a fixed rod and piston. An elongated cam and cam follower move the mold horizontially and as the cylinder moves vertically. The mold baffles are attached to a second moveable cylinder driven by a second piston mounted on the first cylinder. The second moveable cylinder has a cooperating cam and cam follower system for moving the baffles vertically and horizontally.

---

The present invention relates to the molding of molten glass and in particular to an improved mold support means for glass molding machines and which is adapted for use with solid blank molds and related mold baffles.

Hollow glass articles such as tumblers, bottles, and the like are formed on automatic molding machines which receive a charge or gob of molten glass and which shape this molten gob into the finished glass articles in a series of molding steps or operations. The present invention is an improvement upon such automatic glass forming machines where a solid blank mold is used in a molding step during which the glass gob is formed into a preliminary or intermediate shape known as a parison.

A widely used automatic machine for shaping glass articles in this manner is known in the glass industry as an "IS" machine. These machines have been used for a number of years, however, the increasing demands of consumers for more attractive and lighter glass containers and other articles and the needs of packers, particularly food packers, for increased quantities of glass containers have made improved glass products and increased machine outputs desirable.

The original IS machine as illustrated, for example, in Ingle Patent No. 1,911,119 is formed with several identical glass forming sections each of which has two stations for forming glass articles by successive molding operations. The original machines employed split molds at the first of these stations where the glass gob is transformed by blowing or pressing or a combination of blowing and pressing into an intermediate form known as a parison.

It has now been discovered that the performance of this machine can be improved and the appearance of the glass articles perfected by the substitution of a solid blank mold in place of the previously used split mold at the parison forming station. The use of such a one-piece solid blank mold eliminates the seam lines previously formed in the glass by the seams of the split mold and in addition a more efficient and more uniform cooling of the mold has been obtained permitting faster operations.

The parison forming mold is removed from the completed parison after the parison is completed to permit the parison to be transferred on a neck ring invert arm to the next station which is normally a blowing station. With a solid blank mold, the previous relatively simple operation of opening the mold sections must be replaced by a combined vertical and horizontal movement of the mold as well as the related mold closing baffle plates so that both the mold and the baffles are clear of the parison transfer path. The full improvement thought to be obtainable by the substitution of the solid mold for a split mold, however, have not been realized with the mold supports used and in particular it has not been possible to increase the speed of operation of the modified IS machines by the amount originally contemplated.

The present invention provides an improved support or transfer apparatus for both the solid blank mold and the cooperating baffle which provides a smooth, high-speed, and controlled mold movement and which substantially eliminates mold and baffle movement as a limiting factor in machine speed and permits the output rate of the IS machine to be increased to the maximum amount dictated by other considerations such as parison cooling. In addition, the improved support apparatus provides for more efficient mold and baffle movement as it permits a simultaneous clearing movement for the molds and baffles in place of the previous successive movements of the baffles and molds.

Accordingly, an object of the present invention is to provide improved glass forming machines.

Another object of the present invention is to provide an improved mold and baffle support for the parison forming station of a glass forming machine.

Another object of the present invention is to provide a more rapidly and more smoothly functioning support apparatus for a solid blank mold in a glass forming machine.

Other and further objects of the invention will be obvious upon an understanding of the illustrative embodiment about to be described or will be indicated in the appended claims and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 3 is a vertical sectional view taken along line 3—3 on FIG. 1; and

FIG. 4 is an enlarged detailed sectional view illustrating the piston cushion means including an adjustable fluid bleed valve.

As already indicated, the present invention improves the operation of a parison forming station in a glass forming machine such as an IS machine.

Figure 1:
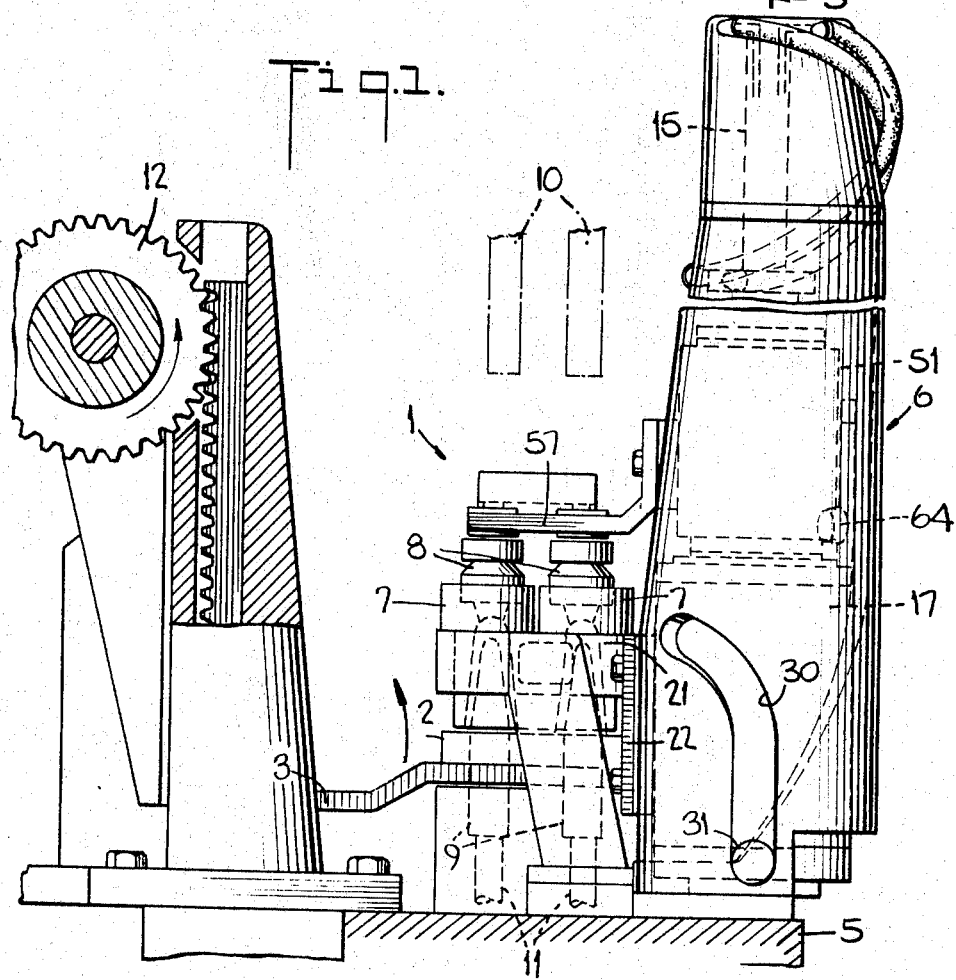
FIG. 1 is a vertical sectional view of an IS glass forming machine illustrating the mold and baffle support apparatus in accordance with the present invention.
Figure 2:
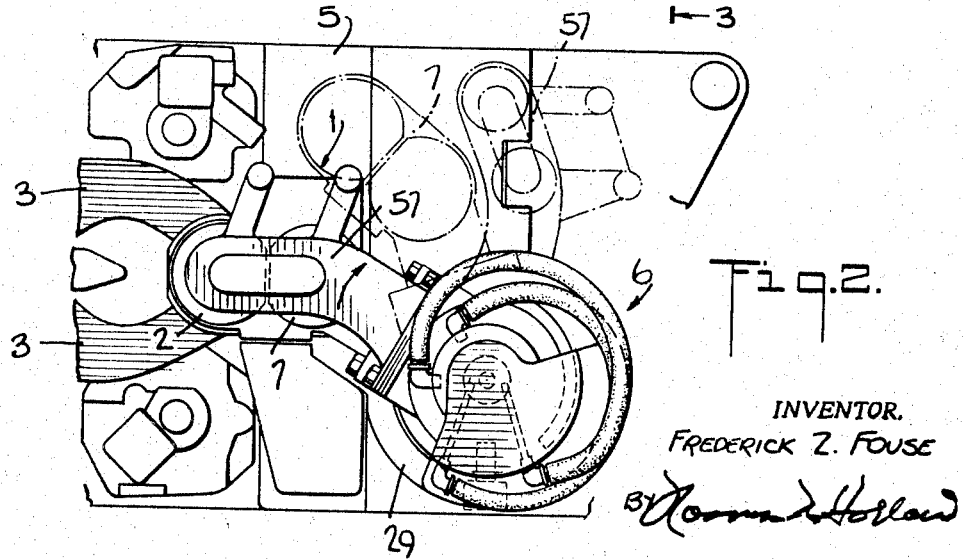
FIG. 2 is a top plan view of the support apparatus of FIG. 1.

FIG. 1 illustrates an improved parison forming station 1 in accordance with the present invention and forming a portion of a typical IS machine section and for use with conventional neck rings held by neck ring holders 2 or neck ring invert arms 3 as used in these machines for transferring the parison 4 from the parison forming station 1 to a second or blow mold station at which the parison is further shaped to the form of the final glass article. The remaining portions of the IS machine not illustrated may be of conventional design as illustrated, for example, in the Ingle Patent No. 1,911,119, and the present description will be directed to the improvements included and to only so much of the regular IS machine structure as is necessary to an understanding of the invention.

FIG. 1 illustrates the parison forming station 1 mounted on an IS machine box 5 and shows a mold support apparatus in accordance with the present invention and illustrated generally at 6 supporting a double gob solid blank mold 7. In the position illustrated, a gob of glass has been previously delivered from a pair of gob delivery chutes 10 into each mold cavity. The open mold cavity tops are closed during the pressing operation by a pair of baffle plates 8 also mounted and moved by the mold support apparatus 6. The glass gobs within the cavities of the mold 7 are pressed into parisons 4 by the parison shaping plungers 9. These plungers 9 are raised vertically into the mold cavities by piston rods 11 included in suitable drive cylinders mounted on the IS machine box 5.

The position illustrated in FIG. 1 for the solid blank mold 7 is the lower or parison forming position of the mold. The lower portion of the inverted parisons formed by the plungers 9 comprise the neck or rim portions of the bottle or other hollow articles. These portions are supported and formed by a pair of appropriately shaped split neck rings held by holders 2 mounted on the neck ring invert arms 3. The invert arms 3 and neck rings and the invert arm support and drive 12 may be similar to those shown in the above mentioned Ingle patent.

After the parisons 4 have been formed by the plungers 9, and prior to the transfer of the parisons to the blow mold stations by the rotation of the invert arms 3, it is necessary to move the solid blank molds 7 out of the path of the moving parisons 4 and also to lift and swing the baffle plates 8 clear of the mold 7. This requires a combined vertical and horizontal movement of both the mold 7 and the baffle plates 8.

The movement of both the mold 7 and the baffle plate 8 is performed by the improved support of the present invention by the support apparatus illustrated in detail in FIG. 3 which will now be described.

The support apparatus 6 comprises a stationary center piston rod 15 having its lower end 16 firmly attached to the IS machine box 5. A cylinder 17 movable with relation to the fixed piston rod 15 is slidably mounted thereon by bearings 18 and 19 and in cooperative working relationship with a fixed piston 20 formed on the piston rod 15. A mold support arm 21 having a vertical mounting flange 22 is attached to the cylinder 17 for movement therewith. Substantial vertical movement of the mold 7 is provided as the cylinder 17 moves from its lower position with the piston 20 adjacent the top 23 of the cylinder to its raised position as illustrated in FIG. 3 and with the fixed piston 20 now positioned adjacent the cylinder base 24. The air or other fluid for moving the cylinder 17 may be conveniently admitted on the appropriate side of the piston 20 for either upward or downward movement of the cylinder 17 through the fluid conduits 25 and 26, respectively, formed within the piston rod 15 and having outlets 27 and 28 on opposite sides of the piston 20.

A housing 29 is provided surrounding the piston rod 15 and cylinder 17 and the necessary compound motion of the mold 7 is obtained from a curved cam slot 30 formed in the housing 29 and for guiding a cam roller 31 rotatably mounted on the cylinder 17. The cylinder 17 being mounted on the circular bearings 18 and 19 provided in the cylinder top 23 and base 24 is seen to be free to rotate about the piston rod 15 under the control of the cam roller 31 and the cooperating curved cam slot 30. The shape of the cam slot 30, as best illustrated in FIG. 1, provides for an initial vertical movement of the mold 7 to permit the mold 7 to clear the parisons 4 and a final combined axial and rotary movement to swing the mold 7 clear of the parison transfer path.

In order to provide for a rapid and efficient movement of the relatively heavy mold 7 in the fashion described above, it has been found desirable to provide a cushioning or damping means operative at the terminal portions of the mold movement in both its upward and downward motion. FIG. 3 illustrates such a cushioning device which is particularly effective in the combination described as it operates directly in conjunction with the driving cylinder to control or cushion its terminal movement without the intermediation of any linkages or couplings which would introduce the usual problems of adjustment and lost motion.

The cushioning means comprises cushioning cavities 35 and 36 formed in the cylinder 17 top 23 and bottom 24 proportioned for slidably receiving the cooperating cushioning pistons 37 and 38 formed on the top and bottom of the stationary piston 20 as illustrated. It is seen, that the entry of the relatively close fitting cushioning pistons 37 and 38 into the cushioning cavities 35 or 36 respectively encloses a trapped and cushioning body of fluid for providing a damping action as the cylinder 17 moves to its final position with respect to the piston 20. The amount of cushioning or damping required is conveniently adjusted by the provision of bleed valves 39 and 40 communicating with the cushioning cavities 35 and 36 respectively.

A preferred embodiment of the bleed valve is illustrated in detail in FIG. 4. As illustrated in this figure, a valve stem 41 is resiliently held in its closed position on port 44 by a coil spring 42 whose force is adjusted by the threaded screw 43. This bleed valve is set to open at a predetermined pressure to provide a smooth cushioned termination for the cylinder motion in either direction.

FIG. 3 also illustrates the novel and cooperating baffle plate attachment to provide the necessary and coordinated movement of the baffle plates 8. As shown in FIG. 3, the baffle plates 8 are slidably supported on the piston rod 15 under the control of the mold supporting cylinder 17 by means of piston sleeve 50 coupled to the top of the cylinder 17. This causes the baffles 8 to be moved simultaneously with the mold 7. In addition, an additional and independent movement is provided for the baffles 8 which permits them to also move with relation to the mold 7 so that the baffles 8 will be positioned clear of the mold 7 when the gobs are loaded into the molds at the beginning of the parison forming operation. This indepedent movement is provided by a second or baffle support cylinder 51 slidably mounted on the piston sleeve 50 on sealed bearings 52 and 53 and controlled by a cooperating drive piston 54 also conveniently formed on the piston sleeve 50. Fluid under pressure is admitted to the top or bottom of the piston 54 through conduits 55 and 56 respectively to provide the necessary lifting or lowering of the baffle cylinders 51 and its interconnected support arm 57. This drive cylinder also includes cushioning or damping devices as already described for cylinder 17 to cushion the terminal portions of the baffle support arm 37 movement comprising cavities 58 and 59 and cooperating cushioning pistons 60 and 61 formed on the piston sleeve 50 as well as bleed valves 62 and 63. Rotation of arm 57 is provided by roller 64 and cam slot 65.

A particular advantage of this novel arrangement wherein the baffle support means is mounted on and moves with the mold support results from the simultaneous movement of the baffle plates 8 with the mold 7 at the beginning of the mold lifting operation. This permits the baffle arm support cylinder 51 to be immediately activated to provide a simultaneous separation of the baffle plates 8 and this movement may be provided independently of the particular mold travel path as there is no relative movement between the piston 54 of the baffle support cylinder 51 and the mold support cylinder 17 and the mold 7 attached thereto.

Where the baffles 8 are supported and moved completely independently, it is necessary to delay the mold 7 movement to assure that the baffles 8 are clear of the mold 7 so that they do not interfere with the mold 7 movement. The above described mounting of the baffle 8 support eliminates this delay in the initiation of the mold 7 movement away from the parison 4.

The fluid for drive cylinders 17 and 51 for moving the mold and baffle supports 21 and 57 as well as for the parison shaping plungers may conveniently be compressed air. Present IS machines include a source of air under pressure and a timed air distributing device. This device includes a timing drum which operates a group of air control valves for supplying air under pressure and which operates suitable exhaust valves in properly timed relation to perform the various operations on the machine in the glass-forming sequence including the above described mold and baffle transfer operations and as further described in the above Ingle patent.

It will be seen that an improved mold support and a cooperating baffle support have been provided for swinging the mold and baffle plates clear of parisons at the completion of the parison forming step. The novel support is particularly advantageous in its provision of the combined vertical and arcuate movement by drive cylinder rotation which minimizes stress on the drive elements at high speeds and which also provides a drive or support with an integral cushioning device permitting high-speed smooth movement with a minimum of wear.

The mounting of the cooperating mold and baffle supports as portions of a coordinated drive also permits a reduction in mold removal time as it permits the simultaneous initiation of both mold and baffle removal.

As various changes may be made in the form, construction and arrangement of the parts herein without department from the spirit and scope of the invention and without sacrificing any of its advantages, it is to be understood that all matter herein is to be interpreted as illustrative and not in a limiting sense.

Having thus described my invention, I claim:

1. An improved support means for a glass mold and a cooperating mold baffle for moving the mold and baffle clear of the molded glass article comprising the combination of a stationary piston rod, a first piston fixed on said rod, a first drive cylinder movably mounted on the rod and piston, a mold, a baffle, a support member operatively coupling said mold to said first cylinder for movement axially of said piston, a second piston slidably mounted on said piston rod and coupled to said first cylinder, a second drive cylinder slidably engaging said second piston, and a support member operatively coupling said second drive cylinder to said baffle.

2. An improved support means for a glass mold and a cooperating mold baffle for providing a compound motion for moving the mold and baffle clear of the molded glass article comprising the combination of a stationary piston rod, a first piston fixed on said rod, a first drive cylinder movably mounted on the rod and piston, a mold, a baffle, a support member operatively coupling said mold to said first cylinder for movement axially of said piston, means for turning said cylinder on the piston axis, a second piston slidably mounted on said piston rod and coupled for movement with said first cylinder, a second drive cylinder slidably engaging said second piston, a support member operatively coupling said second drive cylinder to said baffle, and means for turning said second cylinder on said piston rod and relative to said first cylinder.

3. The support means as claimed in claim 2 which further comprises dash-pot cushioning means positioned within said drive cylinders.

4. The support means as claimed in claim 2 in which said means for turning said cylinders comprises elongated cams and cooperating cam followers.

5. The support means as claimed in claim 2 which further comprises a cushioning means in each of said cylinders including a piston, a cooperating cavity, and a bleed valve communicating with the cavity.

6. An improved support means for a glass mold and a cooperating mold baffle for providing a compound motion for moving the mold and baffle clear of the molded glass article comprising the combination of a stationary piston rod, a first piston means fixed on said rod, a first drive cylinder means movably mounted on the rod and piston means, a mold, a baffle, a support member operatively coupling said mold to said first cylinder means for movement axially of said piston, means for turning said cylinder on the piston axis, a second piston means and a second drive cylinder means slidably mounted on said piston rod and coupled for movement with said first cylinder and relative movement with respect to each other, a support member operatively coupling one of said second means to said baffle, and means for turning said baffle relative to said piston.

References Cited

UNITED STATES PATENTS

| | | | |
|---|---|---|---|
| 1,712,499 | 5/1929 | Jaeger | 65—317 X |
| 3,383,193 | 5/1968 | Bailey | 65—307 X |

S. LEON BASHORE, Primary Examiner

A. D. KELLOGG, Assistant Examiner

U.S. Cl. X.R.

65—219, 226, 242, 317, 321